(12) United States Patent
Takemoto et al.

(10) Patent No.: US 6,857,564 B1
(45) Date of Patent: Feb. 22, 2005

(54) INFORMATION PROVIDING SYSTEM, APPARATUS FOR PRODUCING A MEDIUM FOR PROVIDING THE INFORMATION, APPARATUS FOR RESTORING THE PROVIDED INFORMATION, COMPUTER PRODUCT, A MEDIUM FOR PROVIDING THE INFORMATION

(75) Inventors: Asato Takemoto, Kanagawa (JP); Yukihiro Maeda, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/561,349

(22) Filed: Apr. 28, 2000

(30) Foreign Application Priority Data

Jun. 4, 1999 (JP) .......................................... 11-158623

(51) Int. Cl.[7] ................................................ G06K 5/00
(52) U.S. Cl. ..................................... 235/380; 235/462.1
(58) Field of Search ................................ 235/380, 383, 235/382, 462.01, 462.09, 462.1; 705/18, 21

(56) References Cited

U.S. PATENT DOCUMENTS

| 4,450,535 A | * | 5/1984 | de Pommery et al. ...... 364/900 |
| 5,243,655 A | * | 9/1993 | Wang ........................... 380/51 |
| 5,760,382 A | * | 6/1998 | Li et al. ...................... 235/436 |
| 5,932,863 A | * | 8/1999 | Rathus et al. ........... 235/462.15 |
| 5,933,829 A | * | 8/1999 | Durst et al. ................... 707/10 |
| 6,095,418 A | * | 8/2000 | Swartz et al. .......... 235/462.01 |
| 6,256,638 B1 | * | 7/2001 | Dougherty et al. ......... 707/104 |

FOREIGN PATENT DOCUMENTS

JP     HEI 6-343132 A     12/1994

\* cited by examiner

Primary Examiner—Daniel Stcyr
(74) Attorney, Agent, or Firm—Staas & Halsey LLP (57) ABSTRACT

An information providing system comprises a two-dimensional encoding section which converts at least the information to be provided to the user into two-dimensional codes, a printed sheet producing section which prints the two-dimensional codes on paper, an image reading device which optically reads the two-dimensional codes printed on the paper, and a CPU which restoring the information to be provided to the user based on the two-dimensional codes read by the image reading device.

21 Claims, 10 Drawing Sheets

FD₁ : READER INFORMATION ID

| READER ID | PASSWORD | FIELD CODE A | FIELD CODE B | FIELD CODE C |
|---|---|---|---|---|
| 000001 | Azkxmv | ○ | ○ | ○ |
| 000002 | XafXlm | ○ | | ○ |
| 000003 | KIMfxz | | ○ | ○ |

FD₂ ; READER INFORMATION FILE

| READER ID | PASSWORD | READER LEVEL DL | FIELD CODE A | FIELD CODE B | FIELD CODE C |
|---|---|---|---|---|---|
| 000001 | Azkxmv | 0 | ○ | ○ | ○ |

↓ CHANGE

FD₂' ; READER INFORMATION FILE

| READER ID | PASSWORD | READER LEVEL DL | FIELD CODE A | FIELD CODE B | FIELD CODE C |
|---|---|---|---|---|---|
| A00001 | Bzkxmv | 1 | ○ |  | ○ |

FIG.12

FD₃ ; READER INFORMATION FILE

| READER ID | PASSWORD | READER LEVEL DL | FIELD CODE A | FIELD CODE B | FIELD CODE C |
|---|---|---|---|---|---|
| 000001 | Azkxmv | 0 | ○ | ○ | ○ |
| 000002 | XafXlm | 2 | ○ |  | ○ |
| 000003 | KIMfxz | 1 |  | ○ | ○ |
| 000004 | ZxsF8x4 | 2 |  | ○ | ○ |
| 000005 | Hxafsd8 | 1 | ○ |  | ○ |
| 000006 | Kd9afdw | 2 | ○ |  | ○ |

INFORMATION PROVIDING SYSTEM, APPARATUS FOR PRODUCING A MEDIUM FOR PROVIDING THE INFORMATION, APPARATUS FOR RESTORING THE PROVIDED INFORMATION, COMPUTER PRODUCT, A MEDIUM FOR PROVIDING THE INFORMATION

FIELD OF THE INVENTION

The present invention relates to an information providing system which provides information to the reader by printing the information on a paper media in the form of news papers, journals to the reader. This invention also relates to an apparatus for producing a medium for providing the information, an apparatus for restoring the provided information, a computer product, and a medium for providing the information.

BACKGROUND OF THE INVENTION

Electronic media is becoming popular these days. However, a technique for providing information to readers, by employing conventional paper media such as newspapers, journals and the like as medium is still in use. The publishers of such paper media have been anxious to print reader-attractive information as article in order to increase the circulation. Because of such circumstances, it is demanded to obtain such an information providing system or method which can excite the readers' interest or thirst for knowledge and the like.

Conventionally, such newspapers or journals as typical paper media are equally responsible for sophisticated information society as the important information providing medium, even nowadays in which electronic media such as internet and the like are rapidly popularizing. These paper media have such features that they can be skipped through and they can be instantly referred according to necessity, which cannot be provided by electronic media. Even in the case that the electronic media are further popularized the paper media will be considered not to decline. Some of the paper media are periodically published and the other an non-periodically published. Up-to-date articles, feature stories, supplements, quizzes and like are printed on the periodically published paper media for each publication such that readers are always interested in the paper media.

However, in the conventional paper media serving as the information providing medium, increase/decrease of the circulation thereof directly influences the profit and/or degree of fame of the publishers. Accordingly, the publishers of paper media are spending much time and effort so that they print the articles which attract the interest of readers, thereby leading to an increase in the circulation. For the reason, approaches for increasing the circulation of paper media rather than a novel approach have been conventionally proposed. However, these approaches have ended as a temporary boom, and they are lacking the winning tricks.

A conventional approach for increasing the circulation of paper media, there is an approach to make a contract of subscription between readers and a publisher, such as represented with newspapers. However, readers tend to cancel the subscription in a short term, and subscribe a paper media of another publisher, when the printed articles of paper media (newspapers and journals) and like are not attractive. Therefore, it is very hard to greatly increase the circulation of paper media.

SUMMARY OF THE INVENTION

It is an object of the present invention to provide an information providing system, an apparatus for producing a medium for providing the information, an apparatus for restoring the provided information, a computer product, and a medium for providing the information, which can attract interest of readers and can increase the circulation of paper media rapidly.

In order to achieve the object described above, according to one aspect of the present invention, a large volume of providing information (that is, the information to be provided to the users) is stored in the two-dimensional code beforehand, and the providing information except the printed information of paper media can be provided to readers, by a novel approach for restoring the providing information based on the reading result of the two-dimensional code. Thus, the interest of readers can be attracted, and therefore, the circulation of paper media can be made much more increased.

Further, the level information about the providing information is added in the two-dimensional code. Hence, restoring of the providing information can be limited based on this level information. Therefore, a system in which the charge can be set based on the value of the information to be provided can be realized.

According to another aspect of the present invention, various services can be provided to ones restoring the providing information, by recording the providing information (for example, image information) and the level information (for example, index information indicating the value of image information) on a medium.

Other objects and features of this invention will become apparent from the following description with reference to the accompanying drawings.

DESCRIPTION OF THE PREFERRED EMBODIMENTS

First and second embodiments of an information providing system, an apparatus for producing a medium for providing the information, an apparatus for restoring the provided information, a computer product, and a medium for providing the information according to the present invention will be explained in detail below with reference to the drawings.

Figure 1:
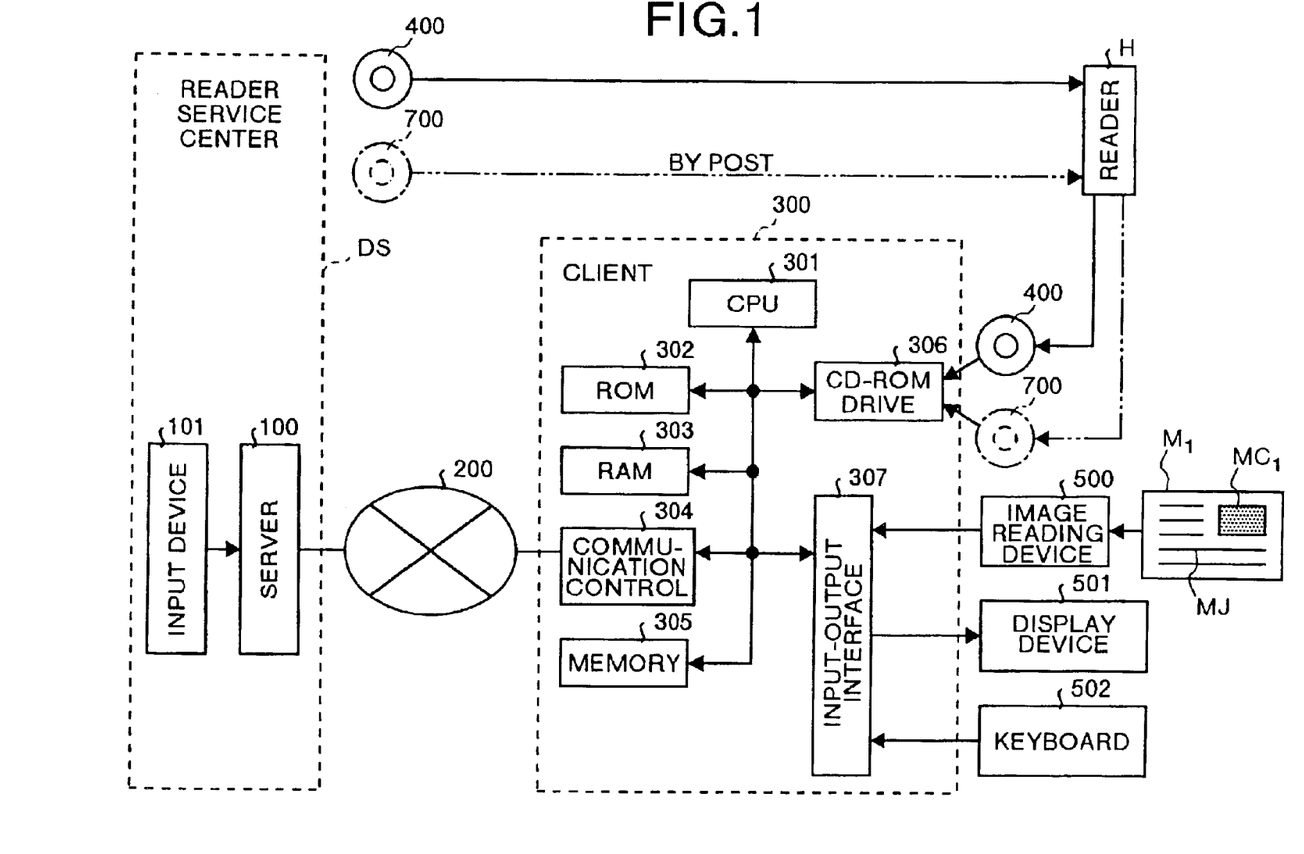
FIG. 1 is a block diagram showing a configuration of a first and a second embodiment of the present invention.

FIG. 1 is a block diagram showing a configuration of the first embodiment of the present invention. Although a CD-ROM 700 is shown in FIG. 1, this CD-ROM is not required in the first embodiment. The CD-ROM 700 is required in the second embodiment which will be explained with reference to FIG. 1. Because the CD-ROM 700 is not required in this first embodiment, the CD-ROM 700 is shown by broken line, and it will assumed that the CD-ROM 700 is not shown. FIG. 1 shows a client/server system comprising a server 100 disposed in reader service center DS, and a client 300 disposed at the side of a reader H. The client 300 and the server 100 are connected to each other through a network 200.

A reader H is subscribing to paper media such as newspapers, journals and like periodically or irregularly. FIG. 1 shows a printed sheet $M_1$ providing a part of space of paper media. The printed sheet $M_1$ is produced by a printed sheet producing apparatus 600 (see FIG. 2). The printed sheet $M_1$ has printed thereon a two-dimensional code $MC_1$ in addition to space information MJ which is essentially contained in any paper media. The two-dimensional code $MC_1$ is equivalent to the code of certain digital data, disposed on the two-dimensional surface, after being converted to the corresponding dot patterns. Besides, Smart Code can be illustrated as an example thereof. Also, the two-dimensional code $MC_1$ has a feature that a lot of information can be recorded in a compressed form, compared to one-dimensional code such as JAN code and the like, and therefore, it is used as a large volume data recording medium. In the first embodiment, the providing information such as text data, static image data, sound data, animation image data, program and the like are compressed in the two-dimensional code $MC_1$ to be recorded. Here, the providing information is the information such as text, static image, sound, animation image, program, which is provided to the reader H from the information provider through the paper media. The two-dimensional code $MC_1$ and the providing information will be explained in detail later.

Further, the two-dimensional code $MC_1$ has an error correcting function based on the mathematical approach. The code $MC_1$ has a feature that correct reading thereof can be performed, when printing precision thereof is poor, or even when it is partially stained or damaged. As examples of the two-dimensional codes $MC_1$, CODE 1, maxci code, QR code, calra code, data code and like can be illustrated as the matrix type two-dimensional code. As other examples of the two-dimensional code $MC_1$, PDF 417, CODE16K, CODE49 and like can be illustrated as the stack type two-dimensional code. Although the wording "two-dimensional codes" is used here the types thereof will be ignored.

Client 300 is disposed at the reader H side. The client 300 has the following function. That is, the client 300 reads the two-dimensional code $MC_1$ according to an application program, reader information files and the like being distributed by the information provider. Further, the client 300 restores the providing information based on the result of this reading. Moreover, the client 300 can access the server 100 through the network 200. In the client 300, a CPU (Central Processing Unit) 301 performs the reading control of two-dimensional code $MC_1$, the restore control of the providing information described above and the like. The operations of the CPU 301 will explained in detail later. A ROM (Read-Only Memory) 302 stores default values, firmware and the like handled by CPU 301. A RAM (Random Access Memory) 303 temporarily stores the operating result and the like in the CPU 301. The communication controller 304 controls data communication performed according to the predetermined communication protocol between the external device (in this case, server 100). Memory 305 is a hard disk device, for example, and stores the data such as providing information and the like obtained from the two-dimensional code $MC_1$ and the like.

A CD-ROM drive 306 is a reading device for reading the contents of a CD-ROM 400 distributed from the reader service center DS. A CD-ROM 400 stores the application program, reader information files and the like. Input-output interface 307 takes an interface between the CPU 301 and the peripheral equipment. An image reading device 500, display device 501 and keyboard 502 are connected as peripheral equipment to the input-output interface 307.

The image reading device 500 is a device which can optically read an image on a paper. The image reading device 500 roughly comprises a light source (such as a light emitting diode, cold cathode ray tube) which reading light toward the image read surface, and a light receiving element (such as a CCD (Charge Coupled Device)) which receives the light reflected from the surface of the paper and converts it into image data. In the first embodiment, image reading device 500 is used, for example, as the device for reading optically the two-dimensional code $MC_1$ printed on the printed sheet $M_1$. The image reading device 500 can roughly be classified into three types, namely, handy-type, flat-bed-type and sheet-feed-type. However, in the present invention, the type of the image reading device 500 is immaterial.

The handy-type device described above is a device which is moved along the object image to be read (for example, the two-dimensional codes $CA_1$, $CB_1$) with the hand-operation. This device is small-sized and light weight compared with the flat-bed-type and sheet-feed-type. On the contrary, the device of flat-bed-type or sheet-feed-type is a desk-top type device, and the reading of the paper is performed by setting the paper to the device. For partially reading printed sheet $M_1$ which are the part of paper media (newspapers, journals and the like), the handy-type is useful among the three types. The display device 501 comprises CRT (Cathode Ray Tube), LCD (Liquid Crystal Display) and the like, for displaying a text, a static image, a animation image and the like. The keyboard 502 is used for the inputting of various commands by reader H, or for the inputting reader's ID, password and the like described hereafter.

The printed sheet producing apparatus 600 that produces the printed sheet $M_1$ will be explained with reference FIG. 2. The printed sheet producing apparatus 600 is disposed at newspaper offices, at the publishers and the like, and is used for printing the providing information for reader H as two-dimensional code on printed sheet comprising paper media (newspapers, journals and the like). In the printed sheet producing apparatus 600, a providing information file producing section 601 produces the providing information files based on the text data, the static image data, the animation image data, the sound data, the program and the like which were produced by word processor, digital camera, digital video camera, reproducing device of CD for music, computer and the like. These text data, static image data, animation image data, sound data, program and the like are providing information presented from information providers to the reader H via the two-dimensional codes.

Figure 3:
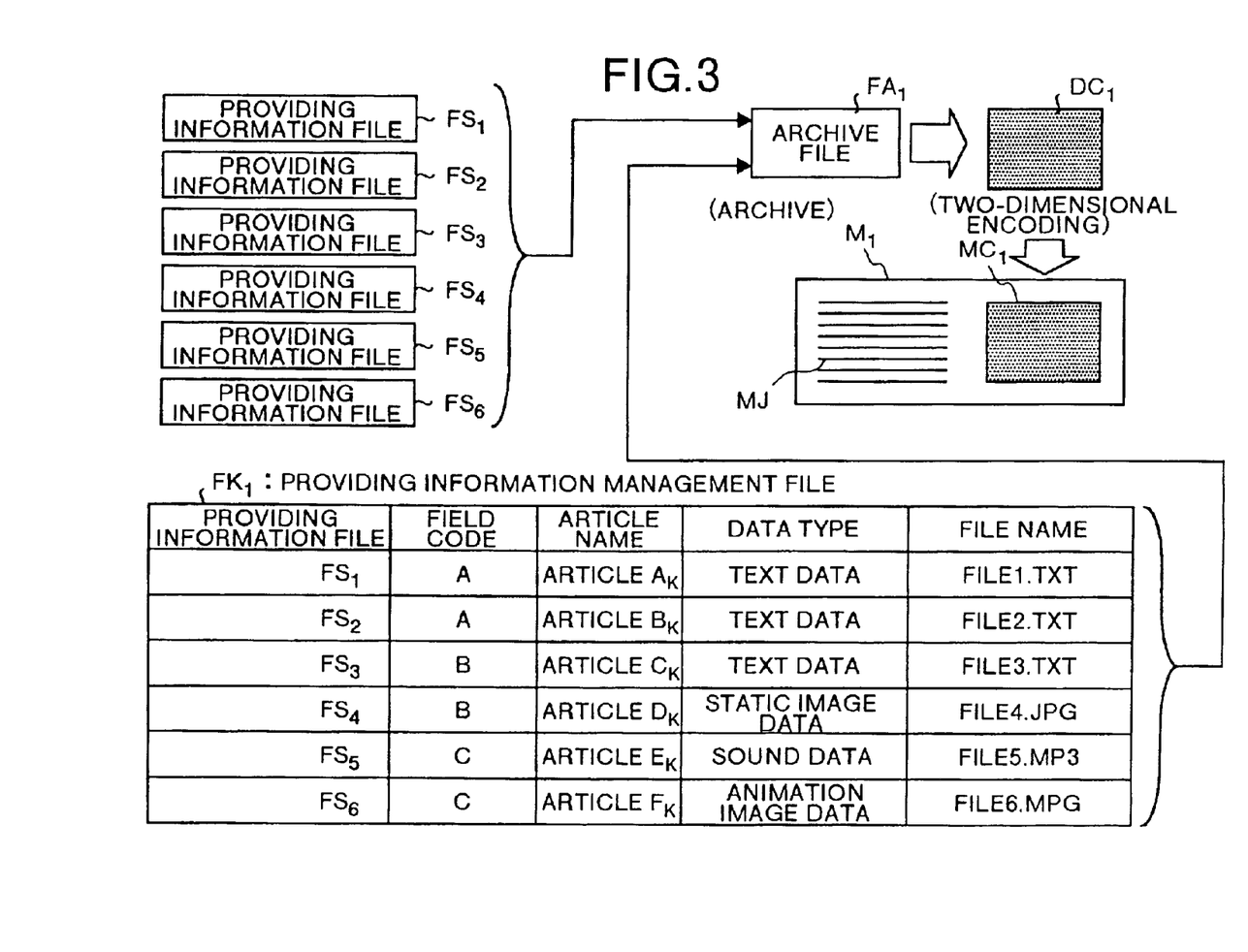
FIG. 3 is a diagram for explaining operations of the printed sheet producing apparatus 600 in the first embodiment.

For example, providing information files $FS_1$ to $FS_6$ shown in FIG. 3 are produced by the providing information file producing section 601. Data classification of these providing information files $FS_1$ to $FS_3$ correspond to the text data, and data classification of providing information file $FS_4$ corresponds to the static image data. Besides, the data classification of providing information $FS_5$ corresponds to the sound data, and the data classification of providing information $FS_6$ corresponds to the animation image data.

Returning to FIG. 2, a providing information management file producing section 602 produces the providing information management file $FK_1$ shown in FIG. 3, based on the information files $FS_1$ to $FS_6$ produced by the provided information file producing section 601. The providing information management file $FK_1$ is a file containing management information such as field code, article name, data classification and file name of each of the providing information files $FS_1$ to $FS_6$. The field code is a code for distinguishing the belonging field of the providing information obtained from the providing information file. For example, field code A indicates that the providing information belongs to sports field, and field code B indicates that the providing information belongs to public entertainment field. Similarly, field code C indicates that the providing information belongs to news field.

The article name is a name given to the providing information, and article names of $A_k$ to $F_k$ are respectively allocated to the providing information files $FS_1$ to $FS_6$. The data classification is classification of data of respective providing information files $FS_1$ to $FS_6$. As the data classification, text data, static image data, sound data, dynamic data and the like may be considered. The file name is the file name allocated to of the providing information files $FS_1$ to $FS_6$. File names of FILE1.TXT, FILE2.TXT, FILE3.TXT, FILE4.JPG, FILE5.MP3 and FILE6.MPG are respectively allocated to the providing information files $FS_1$ to $FS_6$.

Returning to FIG. 2, a file connecting section 603 produces archive file $FA_1$ shown in FIG. 3, by combining (archiving) the plurality of files comprising the providing information files $FS_1$ to $FS_6$ produced by the providing information file producing section 601, and the providing information management file $FK_1$ produced by the providing information management file producing section 602. A two-dimensional encoding section 604 produces the two-dimensional code file $DC_1$ (see FIG. 3) by two-dimensional encoding of the archive file $FA_1$ produced by the file connecting section 603. A space information producing file 605 produces the space of paper media, namely. In other words, the space information producing file 605 produces the space information file J relative to the space information (general article) MJ published on the printed sheet $M_1$. A printed sheet producing section 606 produces the printed sheet $M_1$ being printed with the two-dimensional code $MC_1$ shown in FIG. 3 and space information MJ based on the two-dimensional code file $DC_1$ and the space information file J.

The CD-ROM 400 is mailed to the reader H from reader service center DS. The reader service center DS provides the customer service relative to the plurality of readers (although only one reader is shown in FIG. 1) receiving information providing service through the two-dimensional code described above, and the issuing business of the password and reader ID described later besides the CD-ROM 400 mailing business. A reader ID, password, application program and reader information file $FD_1$ (see FIG. 4) are recorded on the CD-ROM 400. The reader ID is given to each reader and it is used to identify the reader. The password is given to each of reader, and is used to authenticate the. The application program is a program for performing the reading control of the above-stated two-dimensional code, and the restoring the providing information from the two-dimensional code, and it is executed by the client 300 (that is, the CPU 301 in the client 300), when information providing service is required.

Figure 4:
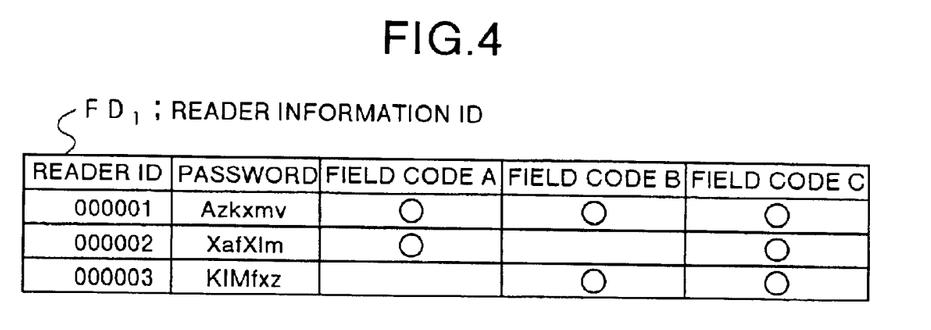
FIG. 4 is a diagram for explaining a data structure of a reader information file $FD_1$ in the first embodiment.

The reader information file $FD_1$ shown in FIG. 4 is a file comprising an information (reader ID, password, field code available to receive the service of the providing information). Namely, in the reader information file $FD_1$, it is mentioned that a reader having a reader ID 000001 and a password Azkxmv is permitted to receive the service of the providing information each belonging to field codes A, B and C respectively given "O" mark in FIG. 4. Similarly, an another reader having a reader ID 000002 and password XafXlm is permitted to receive the service of the providing information respectively belonging to the field code A and the field code C. Please note that the reader having the reader ID 000002 is not permitted to receive the service of the providing information belonging to field code B.

Returning to FIG. 1, the server 100 has the following function. That is, the server 100 can be accessed from the client 300 via the network 200. Thus, the server 100 can receive E-mail asking the problem about the information providing service from the reader H, and send a answers to these questions as reply E-mail. The input device 101 is a device for inputting the data from outside to the server 100. This input device 101 is a keyboard, a CD-ROM drive and the like.

Operations of the first embodiment will be explained here with reference to FIG. 5 to FIG. 8. The operations of the printed sheet producing apparatus 600 shown in FIG. 2 will be explained first with reference to the flowchart of FIG. 5. The information (text data, static image data, sound data, animation image data) to be provided to readers receiving the information providing service is input into the providing information file producing section 601. When the providing information is received, in step SA1, the providing information file producing section 601 produces, for example, the providing information files $FS_1$ to $FS_6$ (see FIG. 3), and outputs these files to the providing information management file producing section 602 as well as to the file connecting section 603.

Figure 5:
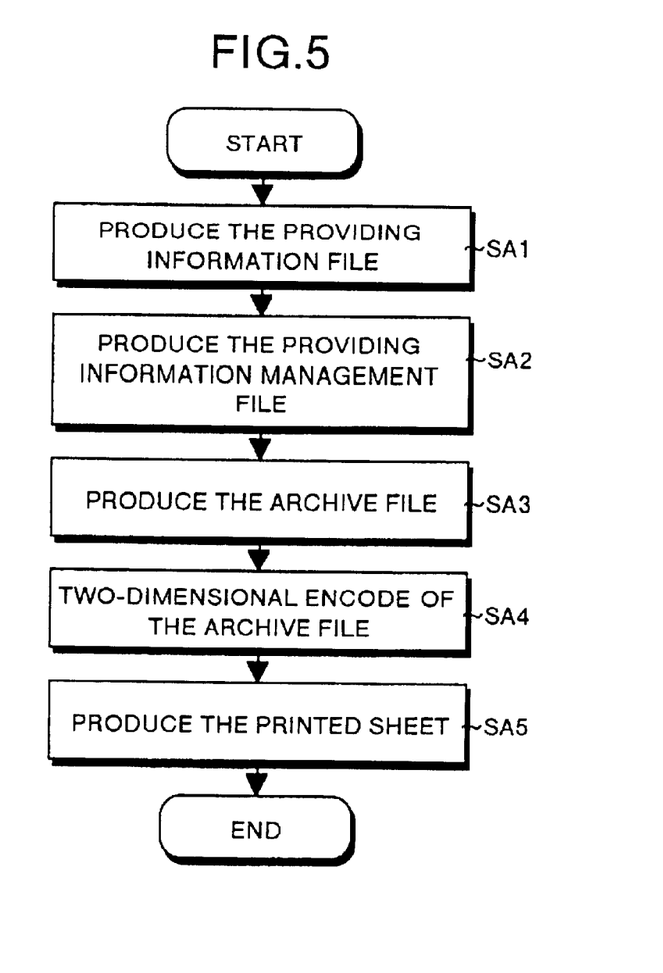
FIG. 5 is a flowchart for explaining operations of the printed sheet producing apparatus 600 in the first and second embodiments.

In step SA2, the providing information management file producing section 602 produces the providing information management file $FK_1$ based on the providing information files $FS_1$ to $FS_6$. In step SA3, the file connecting section 603 produces the archive file $FA_1$ by connecting (archiving) the providing information files $FS_1$ to $FS_6$ and the providing information management file $FK_1$. In step SA4, the two-dimensional encoding section 604 two-dimensionally encodes the archive file $FA_1$ and thus produces the two-dimensional code file $DC_1$.

Further, in step SA5, the printed sheet producing section 606 produces the printed sheet $M_l$ based on the two-dimensional code file $DC_1$ from the two-dimensional encoding section 604 and the space information file J from the space information file producing section 605. The two-dimensional code $MC_1$ corresponding to the two-dimensional code file $DC_1$ and the space information MJ corresponding to the space information file J respectively printed on the printed sheet $M_1$. The printed sheet $M_1$ is sold at the shops in or around a railway station or at the book stores as paper media (newspapers, journals and the like).

However, a reader is required to register beforehand in order to receive the above-stated information providing service. The registration procedure is described here with reference to FIG. 7. When the registration procedure about the information providing service is to be performed, reader H sends a registration form T to the reader service center DS post. Before sending the registration form T, the reader enters his/her own private information such as address, name. When registration form T is received, the people in the reader service center DS scrutinize the registration form T and input the private information on the registration form T into the server 100 using the input device 101. The server 100 then allocates a reader ID 000001 and a password Azkxmv to the reader H and writes a record regarding the reader H into the reader information file $FD_1$ shown in FIG. 4.

Similarly, when the private information of an another reader is input, the server 100 issues another the reader ID and another password and writes a record regarding the another reader into the reader information file $FD_1$. When the registration process is completed, the reader service center DS creates the CD-ROM 400, using a not shown device, in which the application program, reader information file $FD_1$, reader ID 000001, and password Azkxmv of the reader H are recorded thereon.

Figure 6:
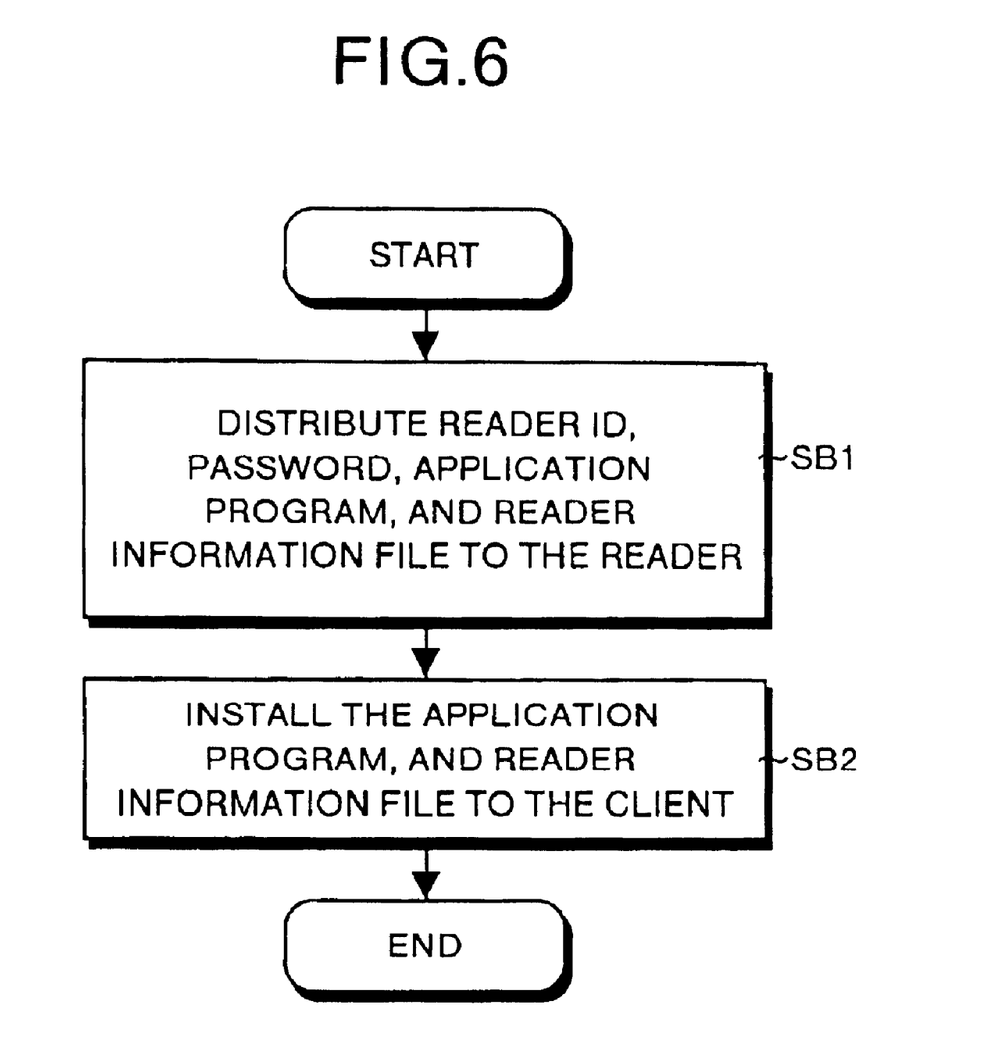
FIG. 6 is a flowchart for explaining operations of the first and second embodiments.
Figure 7:
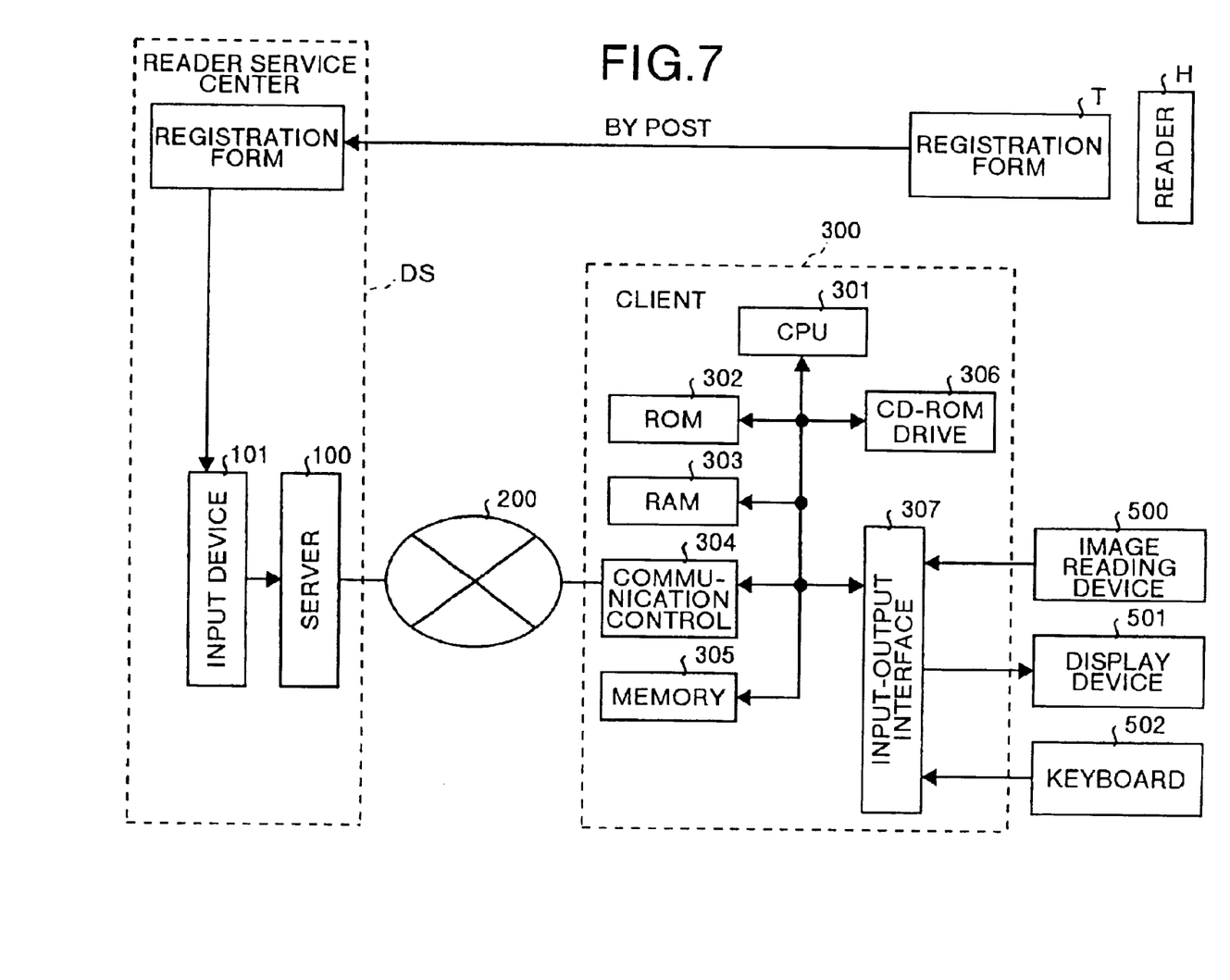
FIG. 7 is a block diagram for explaining registration operations of the first and second embodiments.

When the CD-ROM 400 is produced, in step SB1 shown in FIG. 6, the people at the reader service center DS send the CD-ROM 400 to the reader H by post. Thus, the application program, reader information file $FD_1$, reader ID 000001, and password Azkxmv are distributed to the reader H. In step SB2, the reader H inserts the CD-ROM 400 into the CD-ROM drive 306. Accordingly, the application program and the like is read out from CD-ROM 400, and the installation is performed by being stored in memory 305, under the control of CPU 301.

Figure 8:
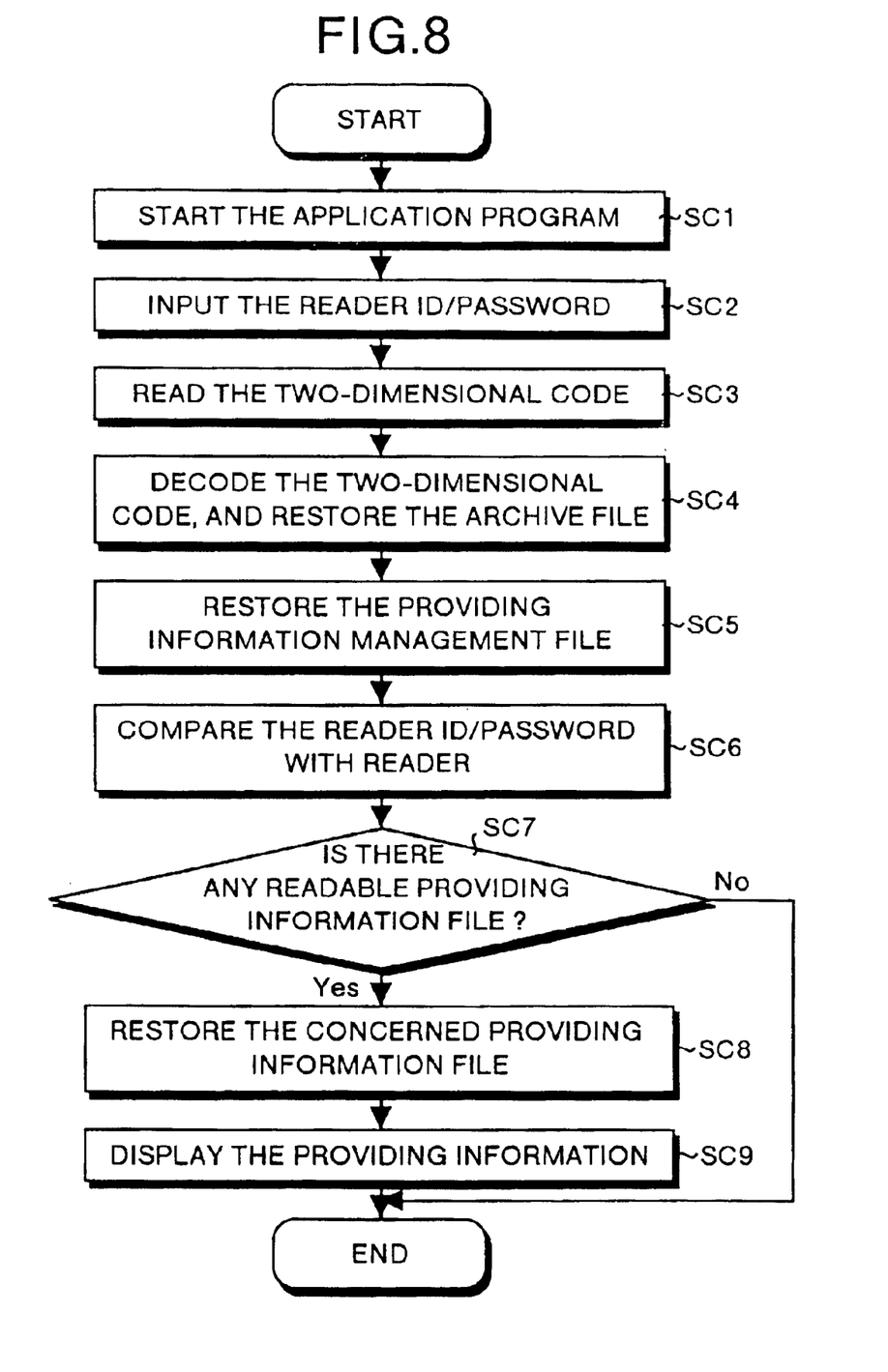
FIG. 8 is a flowchart for explaining operations of a client 300 in the first and second embodiments.

In step SC1 shown in FIG. 8, the reader H who buys the paper media (printed sheet $M_1$) inputs the command for starting the application program described above by keyboard 502, in order to receive the providing information via the two-dimensional code $MC_1$, and then proceeds to step SC2. Thus, the application program is executed by CPU 301, and the reading of the two-dimensional code and the processing about the restoring of the providing information become possible to be performed. In step SC2, the reader H inputs the reader ID and the password allocated to him using the keyboard 502. In step SC3, the reader H operates the image reading device 500 to read the two-dimensional code $MC_1$ on the printed sheet $M_1$ as the image data. The image data is input into the CPU 301 through input-output interface 307. Accordingly, in step SC4, the CPU 301 decodes the two-dimensional code $MC_1$ based on the image data and restores the archive file $FA_1$.

In step SC5, the CPU 301 restores the providing information management file $FK_1$ from the restored archive file $FA_1$. In step SC6, the CPU 301 compares the reader ID and the password input in step SC2 with those in the reader information file $FD_1$ stored in memory 305 and thus authenticates the reader. Further, the CPU 301 checks the field code belonging to the providing information file which can be read by reader H. As shown in FIG. 4, for example, the reader H can read the providing information file belonging to field code A, field code B and field code C.

In step SC7, the CPU 301 refers to the restored providing information management file $FK_1$, and decides whether the concerned reader H has or not the providing information file belonging to field code A, B and C which can be read. If the result of the decision in step SC7 is NO, the process is terminated without performing the restoring of the providing information. Assume that the providing information files $FS_1$ to $FS_6$ belonging to field code A, B and C are contained in the providing information management file $FK_1$. Therefore, the result of the decision in step SC7 will be YES. In step SC8, the CPU 301 restores the providing information files $FS_1$ to $FS_6$ which can be read by reader H from the archive file $FA_1$ and stores the information in the memory 305.

In step SC9, the CPU 301 controls the display device 501 so as to display the providing information which can be displayed, among the providing information each obtained from the providing information files $FS_1$ to $FS_6$. Thus, the CPU 301 controls the display device 501 so as to display the providing information (text, static image, animation image) respectively obtained from the providing information files $FS_1$ to $FS_4$ and $FS_6$ except the providing information file $FS_5$ (sound data), based on the selected command from keyboard 502. Once the information is displayed, the process is completed. Regarding the providing information file $FS_5$, which is a sound data, the sound may be reproduced using a not shown speaker. Such a speaker may be connected to input-output interface 307.

As described above, according to the first embodiment, a large volume of the providing information is recorded in the two-dimensional code beforehand, and the providing information except the printed information MJ of paper media (printed sheet $M_1$) can be provided to the readers, by the novel approach for restoring the providing information based on the reading result of the two-dimensional code, and therefore, the interest of readers can be attracted, and therefore, the circulation of paper media can be made much more increased.

In the above-explained first embodiment, as shown in FIG. 4, the illustrative description was made that the providing information files available to be restored are mutually distinguished, based only on the difference of field codes among readers. In other words, in the first embodiment, between the reader H having the reader ID 000001 and the other reader having the reader ID "000002", the restoring is admitted regarding both the restoring of the providing information files $FS_1$ and $FS_2$ belonging to field code A and the providing information files $FS_5$ and $FS_6$ belonging to field code C. However, the existence of the following service system may be not an unreasonable matter; namely, some readers are admitted to restore the providing information files, but the other readers are not admitted to restore the providing information files, depending on the amount of payment to receive the information providing service. This configuration will be explained as the second embodiment.

Figure 2:
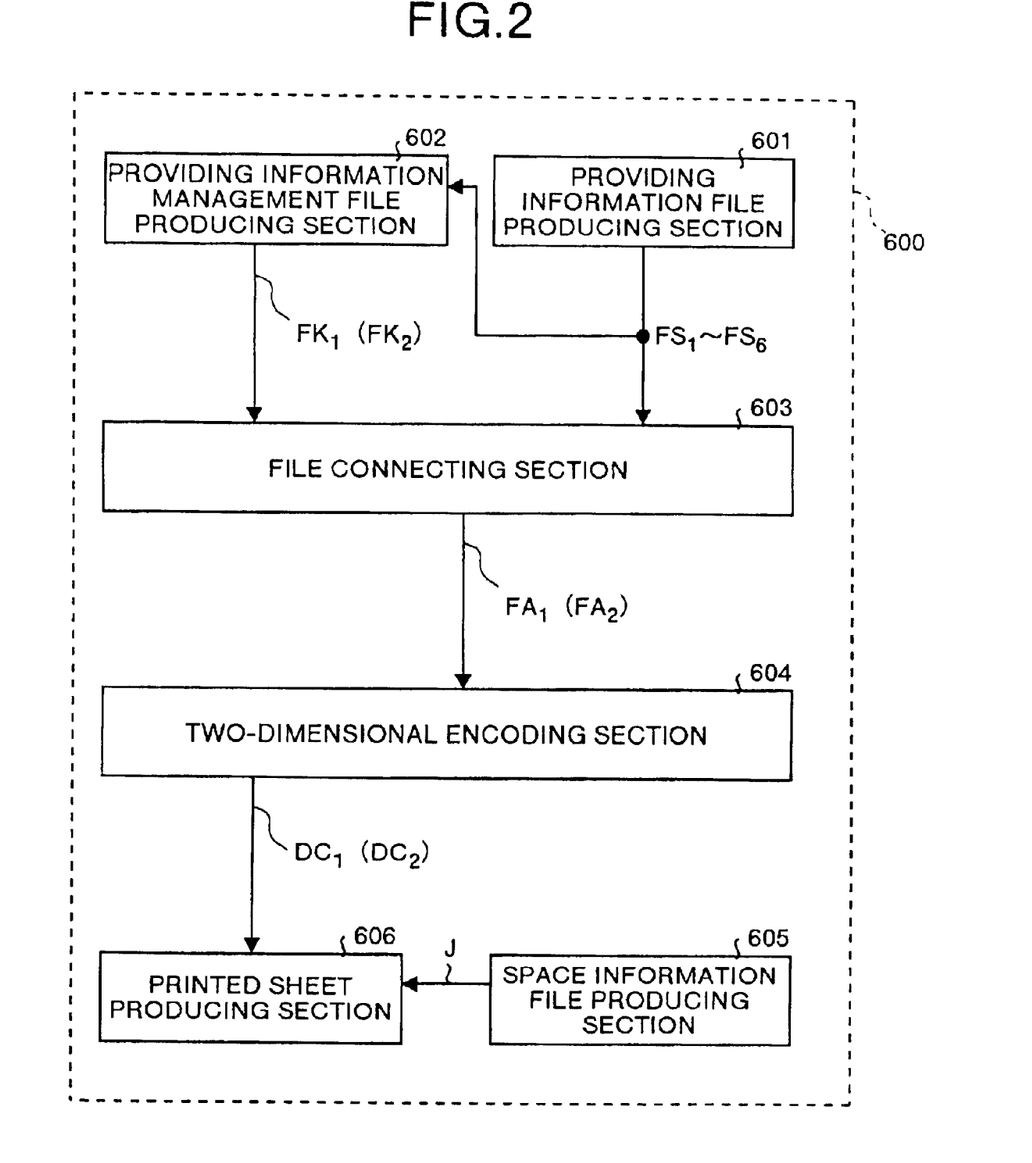
FIG. 2 is a block diagram showing a configuration of a printed sheet producing apparatus 600 in the first and second embodiments.

The basic construction of the second embodiment is similar to the configuration respectively shown in FIG. 1 and FIG. 2. However, in the second embodiment, CD-ROM 700 is used, in addition to the CD-ROM 400 shown in FIG. 1. Further, the providing information management file producing section 602 produces the providing information management file $FK_2$ shown in FIG. 9 instead of the providing information management file $FK_1$ shown in FIG. 3. In the providing information management file $FK_2$, as compared with the providing information management file $FK_1$, the information level JL is set for each of the providing information files $FS_1$ to $FS_6$. The information level JL is represented by three levels of 0, 1, and 2. The information level JL is the index of the value of the information contained in the providing information files $FS_1$ to $FS_6$.

Figure 9:
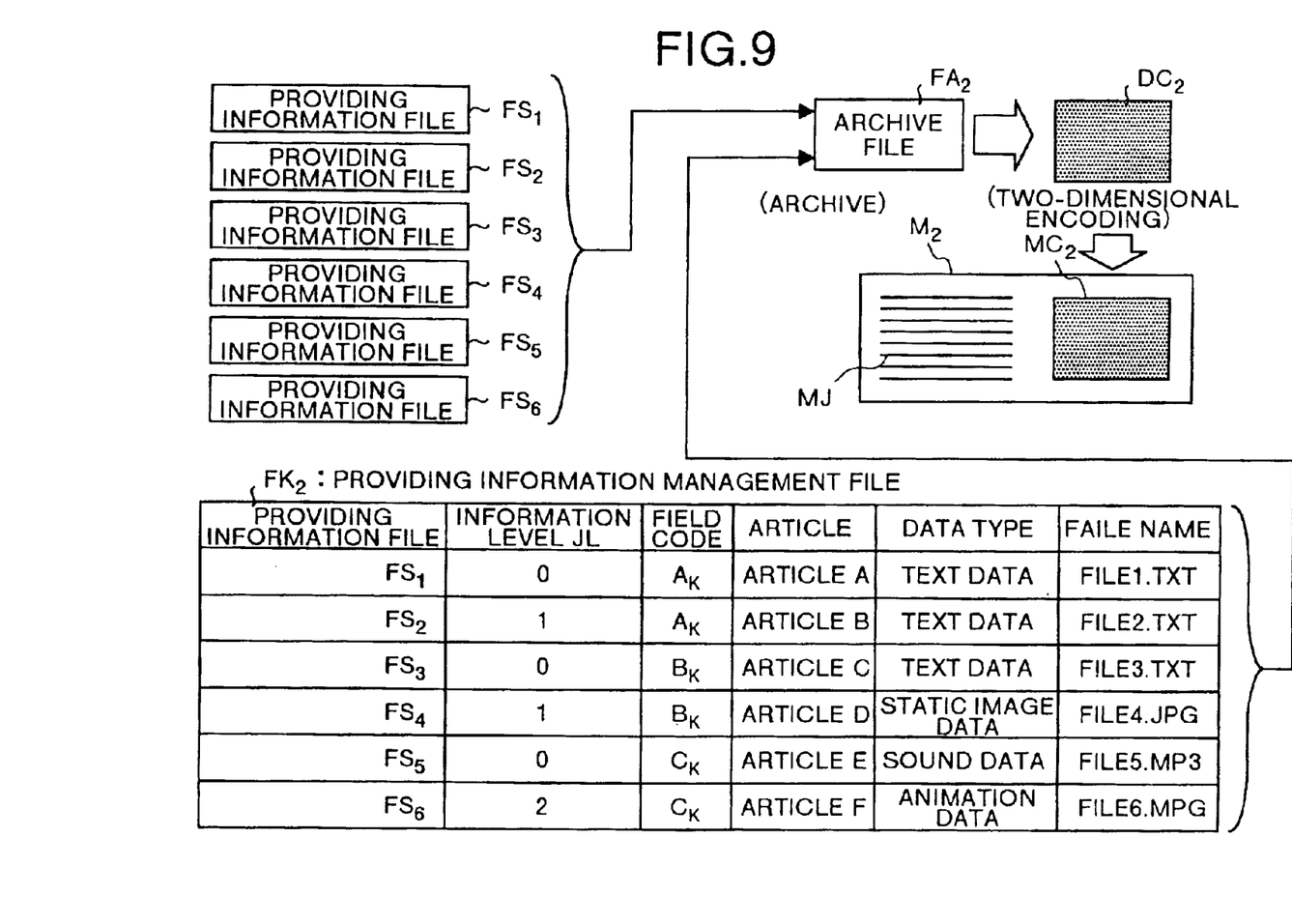
FIG. 9 is a block diagram for explaining operations of the printed sheet producing apparatus 600 in the second embodiment.

Specifically, the providing information files $FS_1$, $FS_3$, and $FS_5$ having the information level JL of 0 can be restored by all the readers who pay, for example, ¥1000 per month as the basic charge to the information provider (reader service center DS) for receiving the information providing service. Further, the providing information files $FS_2$ and $FS_4$ having the information level JL of 1 can be restored by the readers who pay at least some additional charge (for example ¥1000 per month) in addition to the basic charge. Further, the providing information file $FS_6$ having the information level JL of 2 can be restored by only the readers who pay a still higher additional charge (for example ¥2000 per month) in addition to the basic charge.

Figure 11:
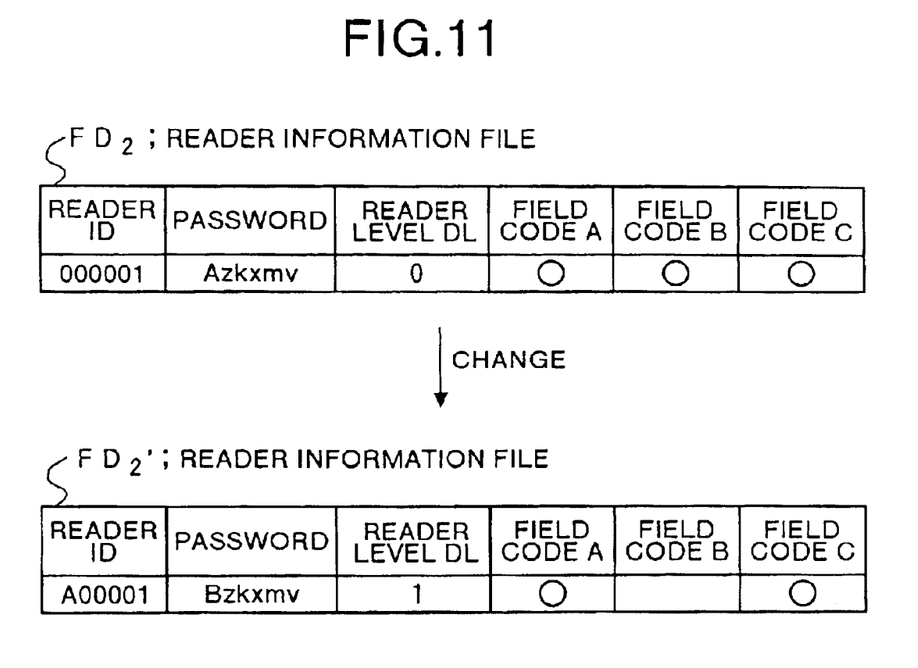
FIG. 11 is a diagram showing the data structures of reader information files $FD_2$, $FD_2'$ in the second embodiment.
Figure 12:
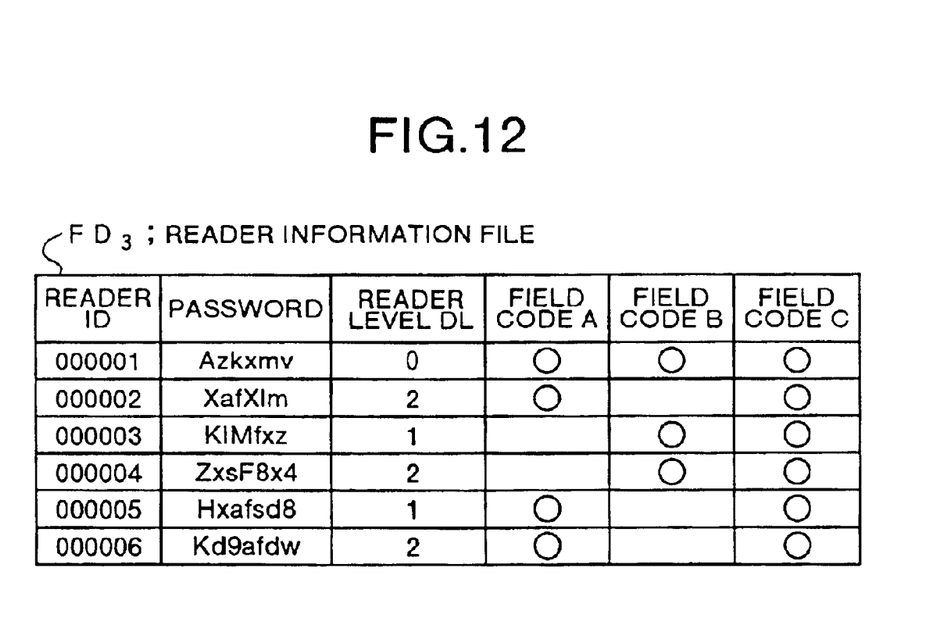
FIG. 12 is a diagram showing a data structure of a reader information file $FD_3$ in the second embodiment.

Namely, the general readers who pay just only the basic charge can not restore any providing information except the providing information having an information level JL of 0. The readers who pay an additional charge can restore the providing information files having an information level JL of 0 and 1. On the other hand, the readers who pay a still higher additional charge can restore all the providing information files having an information level JL of 0, 1 and 2. As shown in FIG. 11 or FIG. 12, the readers are also allocated with a reader level DL. The reader level DL of 0 is allocated to the readers who pay only the basic. A reader level DL of 1 is allocated to the readers who pay an additional charge. Similarly, the reader level DL of 2 is allocated to the readers who pay a still higher additional charge.

In this second embodiment, a file having the format of the reader information file $FD_3$ shown in FIG. 12 or the reader information file $FD_2$ shown in FIG. 11 is used instead of the reader information file $FD_1$ shown in FIG. 4. As shown in FIG. 12, in the reader information file $FD_3$ a reader level DL is set in correlation to each reader ID. The reader level DL of 0 to 2 correspond to the information level JL of 0 to 2 in the providing information management file $FK_2$. The readers having a reader level DL of 0 can not restore any providing information file except the providing information files having the information level JL of 0. The readers having a reader level DL of 1 can restore the providing information files having the information level JL of 0 and 1. The readers having a reader level DL of 2 can restore all the providing information files having the information level JL of 0, 1, and 2.

Operations of printed sheet producing apparatus 600 of the second embodiment will be explained with reference to the flowchart in FIG. 5. In step SA1, in the same manner as explained in the first embodiment, the providing information file producing section 601 produces the six providing information files $FS_1$ to $FS_6$ shown in FIG. 9. In step SA2, the providing information management file producing section 602 produces the providing information management file $FK_2$ based on the providing information files $FS_1$ to $FS_6$. In step SA3, the file connecting section 603 produces the archive file $FA_2$ by combining (archiving) the providing information files $FS_1$ to $FS_6$ and the providing information management file $FK_2$. In step SA4, the two-dimensional encoding section 604 two-dimensionally encodes the archive file $FA_2$ and thus produces the two-dimensional code file $DC_2$.

In step SA5, the printed sheet producing section 606 produces the printed sheet $M_2$ based on the two-dimensional code file $DC_2$ from the two-dimensional encoding section 604 and the space information file J from the space information file producing section 605. The two-dimensional code $MC_2$ corresponding to the two-dimensional code file $DC_2$ and the space information MJ corresponding to the space information file J are respectively printed on the printed sheet $M_2$. The printed sheet $M_2$ is sold at the shops in or around the railway station or the book stores as paper media (newspapers, journals and the like).

A reader is required to register beforehand in order to receive the above-stated information providing service. The registration procedure is described here with reference to FIG. 7. When the registration procedure about the information providing service is to be performed, reader H sends a registration form T to the reader service center DS post. Before sending the registration form T, the reader enters his/her own private information such as address, name. Further, the reader pays, for example, the basic charge using a credit card and the like, for receiving the information providing service. When registration form T and the basic charge are received, the people in the reader service center DS scrutinize the registration form T and input the private information on the registration form T into the server 100 using the input device 101 as well as input 0 as the reader level DL of the reader H. The server 100 then allocates a reader ID 000001 and a password Azkxmv to the reader H and writes a record regarding the reader H into the reader information file FD, shown in FIG. 11. Similarly, when the private information of an another reader is input, the server 100 issues another the reader ID and another password and writes a record regarding the another reader into the reader information file $FD_3$ (see FIG. 12).

The data on the first line of the reader information file $FD_2$ indicates the reader ID, password, reader level DL (0) and the like of the reader H. When the registration process is completed, the reader service center DS creates the CD-ROM 400, using a not shown device, in which the application program, reader information file $FD_2$, the reader ID, and the password of the reader H are recorded thereon. When the CD-ROM 400 is produced, in step SB1 shown in FIG. 6, the people at the reader service center DS send the CD-ROM 400 to the reader H by post. Thus the application program, reader information file $FD_2$, reader ID 000001, and password Azkxmv are distributed to the reader H. In step SB2, the reader H inserts the CD-ROM 400 into the CD-ROM drive 306. Accordingly, the application program and the like is read out from CD-ROM 400, and the installation is performed by being stored in memory 305, under the control of CPU 301.

In step SC1 shown in FIG. 8, the reader H who buys the paper media (printed sheet $M_1$) inputs the command for starting the application program described above by keyboard 502, in order to receive the providing information via the two-dimensional code $MC_1$, and then proceeds to step SC2. Thus, the application program is started by CPU 301, and the reading of the two-dimensional code and the processing about the restoring of the providing information become possible to be performed. In step SC2, the reader H inputs the reader ID and the password allocated to him using the keyboard 502. Instep SC3, the reader H operates the image reading device 500 to read the two-dimensional code $MC_2$ on the printed sheet $M_2$ as the image data. The image data is input into the CPU 301 through input-output interface 307.

Accordingly, in step SC4, the CPU 301 restores the archive $FA_2$ by decoding the two-dimensional code $MC_2$ based on the image data. In step SC5, the CPU 301 restores the providing information management file $FK_2$ from the restored archive file $FA_2$. In step SC6, the CPU 301 compares the reader ID and the password input in step SC2 with those in the reader information file $FD_2$ stored in the memory 305 and thus authenticates the reader. Further, the CPU 301 checks the field code belonging to the providing information file which can be read by reader H. As shown in FIG. 11, the reader H having the reader ID 000001 and the password Azkxmv has the reader level DL of 0. Therefore, this reader H can only read the providing information files having the information level JL of 0 among the providing information files belonging to field code A, field code B and field code C.

In step SC7, the CPU 301 refers to the restored providing information management file $FK_2$, and decides whether the concerned reader H has or not the providing information file belonging to field code A, B and C which can be read and also decides whether the information level JL is 0 or not. If the result of this decision in step SC7 is NO, the process is terminated without of performing the display operations of the providing information.

Since the providing information management file $FK_2$ comprises the providing information files $FS_1$, $FS_3$, and $FS_5$ belonging to the field code A, B and C at the information level of 0, the CPU 301 decides the decision result in step SC7 to be YES. Thus, since the reader level DL of the reader H is 0, the reader H can restore the providing information file $FS_1$ belonging to the field code A, but can not restore the providing information file $FS_2$ belonging to same field code A (because the information level JL is 1). In step SC8, the CPU 301 restores the providing information files $FS_1$, $FS_3$, and $FS_5$ which can be read by the reader H from the archive file $FA_2$ and stores these files in the memory 305. In step SC9, the CPU 301 controls the display device 501 so as to display the providing information that can be displayed, among the providing information each obtained from the providing information files $FS_1$, $FS_3$, and $FS_5$. Thus, the CPU 301 controls the display device 501 so as to display the providing information (text) each obtained from the providing information files $FS_1$ and $FS_3$ except the providing information file $FS_5$ (sound data). Once the information is displayed, the process is completed. Regarding the providing information file $FS_5$, which is a sound data, the sound may be reproduced using a not shown speaker. Such a speaker may be connected to input-output interface 307.

Figure 10:
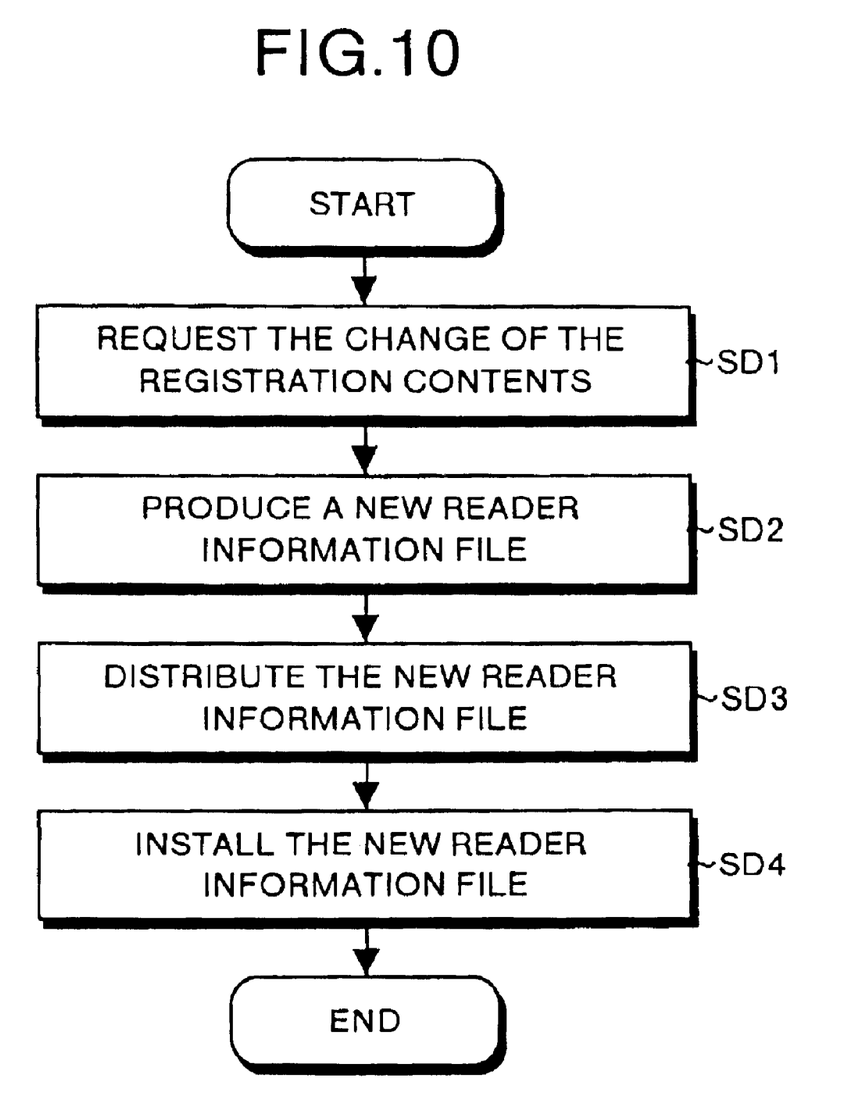
FIG. 10 is a flowchart for explaining change operations of registration contents in the second embodiment.

An operations of for changing the registration contents will be explained here with reference to FIG. 10. The following explanation assumes a case in which the reader H wants to change his/her reader level DL from 0 to 1. In this case, in step SD1, the reader H fills the registration form T and specifically mentions that he/she would like to change the registered contents and sends the form to the reader service center DS by post. Further, the reader also pays an additional charge using the credit card and the like, so as to receive the information providing service corresponding to the reader level DL of 1.

When the registration form T and the additional charge are received, the people in the reader service center DS scrutinize the registration form, and change the reader level DL of reader H from 0 to 1 by inputting the new reader level into the server 100 using the input device 101. In step SD2, the server 100 produces a new reader information file $FD_2$' shown in FIG. 11 based on the reader information file $FD_2$. The server 100 changes the reader level DL of the reader H from 0 to 1. Further, the server 100 changes the reader ID of the reader H from 000001 to A00001 and the password from Azkxmv to Bzkxmv The reader ID and the password are changed in order to ensure the security. Thus, if the security is sufficiently ensured, it is not necessary to change the reader ID and the password.

The data on the first line of the reader information file $FD_2$' indicates the reader ID, password, reader level DL (1) and the like of the reader H. The reader service center DS creates the CD-ROM 700, using a not shown device, in which the new reader information file $FD_2$', reader ID A00001, and password "Bzkxmv" of the reader H is recorded thereon. When the CD-ROM 700 is produced, in step SB1 shown in FIG. 6, the people at the reader service center DS send the CD-ROM 400 to the reader H by post. Thus, the new reader information file $FD_2$', reader ID A00001, and password are distributed to the reader H. In step SB2, the reader H inserts the CD-ROM 700 into the CD-ROM drive 306. Accordingly, the new reader information file $FD_2$', reader ID, and password are read out from the CD-ROM 700, and the installation is performed by being stored in memory 305, under the control of CPU 301.

Accordingly, reader H restores the providing information file from the two-dimensional code, based on the new reader information file $FD_2$'. Since reader H now has the reader level DL of 1, the providing information file $FS_5$ belonging to the field code A at the information level JL of 1 shown in FIG. 9 not restored at the reader level DL 0 becomes possible to be restored.

As described above, according to the second embodiment, by containing the information level JL about the providing information in two-dimensional code, in comparing the information level JL with the reader level DL being set in advance by client 300, since it becomes possible to limit the restoring of the providing information, when the information providing service is performed, the charge for the readers can be set step-by-step depending on the reader level DL.

Although the first and second embodiments according to the present invention have been described in detail with reference to the drawings, the specific construction of the present invention is not limited to the first and second embodiments. Various modification and changes in design can be applied to the present invention without departing from the spirit and/or scope of the invention. For example, in the first and second embodiments, for the distribution of the application program, reader information files and the like the CD-ROM 400 (or the CD-ROM 700) was explained as an example of the distribution medium. But the present invention is not limited to this examples, and thus, other medium such as the magneto-optical disk, the floppy disk and the like can be used as the distribution medium. In this case, a magneto-optical disk drive, a floppy disk drive and the like may be provided in substitution for the CD-ROM drive 306 shown in FIG. 1.

Further, in the first and second embodiments, the distribution of the application program, the reader information files and the like are also made possible, by printing the two-dimensional code on the printed sheet in which the application program, the reader information files and the like are two-dimensional encoded. In this case, similar to the above-stated operations, the reader H may perform the installation, by reading the two-dimensional code described above by the image reading device 500.

Although it is mentioned that the application program and the like is distributed to the reader H through the CD-ROM 400 or CD-ROM 700, the application program and the like may be being downloaded to the client 300 through the network 200 from the server 100. In this case, the data (application program and the like) in the CD-ROM 400 or in the CD-ROM 700 is input into the server 100 through the input device 101 beforehand, and by accessing the server 100 from client 300 through network 200, the application program and the like may be downloaded.

Similarly, although it was described in the first and second embodiments that the registration/change procedure is performed by mailing the registration form T to reader service center DS, the on-line registration operations may also performed, by accessing server 100 from client 300 through network 200, and then, the registration/change operations can be carried out by transmitting the necessary private information.

Further, although it was described that the client 300 is the computer terminal, the type of the computer terminal is immaterial. That is, a desktop-type terminal, a laptop-type terminal, a note-type terminal will do. A mobile-type information terminal will also of course do.

Further, the program for realizing the function of the printed sheet producing apparatus 600 shown in FIG. 2 may be recorded in the computer readable recording medium, and the program may be executed by reading the program with a computer which is similar to the client 300 shown in FIG. 1. In this case, portable-recording mediums other than the CD-ROM, that is the optical disk, the hard-disk and the like may be considered. Further, the network which temporarily records/holds the data may be contained.

As described above, according to one aspect of the present invention, a large volume of providing information is stored in the two-dimensional code beforehand, and the providing information except the printed information of paper media can be provided to readers, by a novel approach for restoring the providing information based on the reading result of the two-dimensional code. Thus, the interest of readers can be attracted, and therefore, the circulation of paper media can be made much more increased.

Further, the level information about the providing information is added in the two-dimensional code. Hence, restoring of the providing information can be limited based on this level information. Therefore, a system in which the charge can be set based on the value of the information to be provided can be realized.

According to another aspect of the present invention, various services can be provided to ones restoring the providing information, by recording the providing information (for example, image information) and the level information (for example, index information indicating the value of image information) on a medium.

What is claimed is:

1. An information providing system comprising:
    an encoding unit which converts content information designed for use by end users, and an index corresponding to one of a plurality of subscription levels used by potential end users, the encoding unit converting the content information and the index to two-dimensional codes;
    a medium producing unit which produces an information providing medium by printing the two-dimensional codes on a media;
    a reading unit for reading the two-dimensional codes printed on said information providing medium, the two dimensional codes being read for possible use by a current end user;
    a comparison unit for comparing the index with a subscription level of the current end user; and
    an information restoring unit which restores the content information that is to be provided to the end user, based on the two-dimensional codes if the index corresponds to a subscription level greater than or equal to the subscription level of the current end user.

2. The information providing system according to claim 1, wherein the content information contains at least one of text data, static image date, sound data, animation data and a program.

3. The information providing system according to claim 1, wherein the media is a paper media.

4. An apparatus for producing a medium for providing an information, said apparatus comprising:
    an encoding unit which converts content information designed for use by end users to two dimensional codes; and
    a medium producing unit which produces an information providing medium by printing the two-dimensional codes on a media wherein
    said encoding unit converts into two dimensional code both the content information and an index corresponding to one of a plurality of subscription levels used by potential end users so that the content information can be restored if the index corresponds to a subscription level greater than or equal to the subscription level of a current end user.

5. The apparatus for producing a medium for providing an information according to claim 4, wherein the content information contains at least one of text data, static image date, sound data, animation data and a program.

6. The apparatus for producing a medium for providing an information according to claim 4, wherein the media is a paper media.

7. An apparatus for restoring a provided information, said apparatus comprising:
    a reading unit for reading two-dimensional codes printed on an information providing medium, the two-dimensional codes corresponding to content information for use by end users; and
    an information restoring unit which restores the content information based on the two-dimensional codes read by said reading unit wherein
    the two-dimensional codes are obtained by two-dimensionally encoding both the content information and an index corresponding to one of a plurality of subscription levels used by potential end users, and
    said information restoring unit first restores the index, and restores the content information only if the index corresponds to a subscription level greater than or equal to the subscription level of a current end users.

8. The apparatus for restoring a provided information according to claim 7 wherein the content information contains at least one of text data, static image date, sound data, animation data and a program.

9. Apparatus for restoring a provided information according to claim 7 wherein the media is a paper media.

10. A computer readable medium for storing instructions, which when executed by a computer, causes the computer to perform the steps of:
    encoding content information designed for uses by end users and an index corresponding to one of a plurality of subscription levels used by potential end users; and
    producing an information providing medium by printing the two-dimensional code on media such that the content information can be restored if the index corresponds to a subscription level greater than or equal to a subscription level of a current end user.

11. The A computer readable medium for storing instructions according to claim 10 wherein the content information contains at least one of text data, static image date, sound data, animation data and a program.

12. The A computer readable medium for storing instructions according to claim 10 wherein the media is a paper media.

13. A computer readable medium for storing instructions, which when executed by a computer, causes the computer to perform the steps of:

reading two-dimensional codes printed on an information providing medium, the two-dimensional codes corresponding to content information designed for use by end users; and restoring the content information based on the read two-dimensional codes, wherein the two-dimensional codes are obtained by two-dimensionally encoding both the content information and an index corresponding to one of a plurality of subscription levels used by potential end users, and the index is restored first, and the content information is restored only if the index corresponds to a subscription level greater than or equal to a subscription level of a current end user.

14. The information providing system according to claims 13, wherein the content information contains at least one of text data, static image date, sound data, animation data and a program.

15. The information providing system according to claim 13, wherein the media is a paper media.

16. A medium for providing information characterized in that, two-dimensional codes recorded on the medium, the two dimensional codes being obtained by two-dimensional conversion of both content information designed for use by end users and an index corresponding to one of a plurality of subscription levels used by potential end users such that the content information is restored if the index corresponds to a subscription level greater than or equal to a subscription level of a current end user.

17. The medium for providing information according to claim 16, wherein the content information contains at least one of text data, static image date, sound data, animation data and a program.

18. The medium for providing information according to claim 16, wherein the media is a paper media.

19. An information providing system comprising:

an encoding unit which converts content information designed for use by end users and an index corresponding to one of a plurality of subscription levels used by potential end users, into two-dimensional codes;

a medium producing unit which produces an information providing medium by printing the two-dimensional codes on a media;

a reading unit for reading the two-dimensional codes from said information providing medium; and a reproduction unit to selectively access the content information using the index and to reproduce the content information if the index corresponds a subscription level greater than or equal to a subscription level of a current end user.

20. The information providing system according to claim 19, wherein the content information contains at least one of text data, static image date, sound data, animation data and a program.

21. The information providing system according to claim 19, wherein the media is a paper media.

* * * * *

UNITED STATES PATENT AND TRADEMARK OFFICE
CERTIFICATE OF CORRECTION

PATENT NO. : 6,857,564 B1  
DATED : February 22, 2005  
INVENTOR(S) : Asato Takemoto et al.

It is certified that error appears in the above-identified patent and that said Letters Patent is hereby corrected as shown below:

Column 15,
Line 15, change "claims" to -- claim --.

Signed and Sealed this

Thirtieth Day of August, 2005

JON W. DUDAS
*Director of the United States Patent and Trademark Office*